United States Patent
Chisholm et al.

(10) Patent No.: US 7,850,893 B2
(45) Date of Patent: ***Dec. 14, 2010

(54) MOLDED PLASTIC CONTAINER AND PREFORM HAVING INSERT-MOLDED RFID TAG

(75) Inventors: Brian J. Chisholm, Sylvania, OH (US); Douglas W. Abbott, Bowling Green, OH (US)

(73) Assignee: Rexam Healthcare Packaging Inc., Perrysburg, OH (US)

( * ) Notice: Subject to any disclaimer, the term of this patent is extended or adjusted under 35 U.S.C. 154(b) by 206 days.

This patent is subject to a terminal disclaimer.

(21) Appl. No.: 11/607,523

(22) Filed: Dec. 1, 2006

(65) Prior Publication Data

US 2008/0131629 A1  Jun. 5, 2008

(51) Int. Cl.
*B29C 46/14* (2006.01)
(52) U.S. Cl. .................. 264/272.11; 264/275
(58) Field of Classification Search ............ 264/275, 264/272.15, 259, 500, 523
See application file for complete search history.

(56) References Cited

U.S. PATENT DOCUMENTS

| | | | |
|---|---|---|---|
| 2,788,048 A | 4/1957 | Kimes | |
| 3,919,374 A | 11/1975 | Komendowski | |
| 4,218,204 A | 8/1980 | Edwards | |
| 4,572,856 A * | 2/1986 | Gembinski | 428/71 |
| 4,708,630 A | 11/1987 | Hammond | |
| 4,813,564 A | 3/1989 | Cooper et al. | |
| 4,988,472 A * | 1/1991 | Orimoto et al. | 264/273 |
| 5,963,132 A | 10/1999 | Yoakum | |
| 6,206,282 B1 | 3/2001 | Hayes, Sr. et al. | |
| 6,251,323 B1 | 6/2001 | Hoedl et al. | |
| 6,259,369 B1 | 7/2001 | Monico | |
| 6,268,037 B1 | 7/2001 | Butler et al. | |
| 6,302,461 B1 | 10/2001 | Debras et al. | |

(Continued)

FOREIGN PATENT DOCUMENTS

DE  9417863 U1  1/1995

(Continued)

OTHER PUBLICATIONS

Elsila, Martti, Mika Sulasari, "Method for providing a transport or storage structure with a remote-readable escort memory and a transport or storage structure" WO 93/24381, PCTFI93/00225, Published Dec. 9, 1993.*

(Continued)

*Primary Examiner*—Christina Johnson
*Assistant Examiner*—Galen Hauth
(74) *Attorney, Agent, or Firm*—Reising Ethington PC

(57) ABSTRACT

An RFID assembly includes an RFID inlay, with an RFID tag, encapsulated within a plastic housing. The housing has a peripheral array of flexible resilient fingers for mounting the housing within a pocket on a support structure, such as a pocket on a mold core. The pocket preferably is on an end of the mold core so that the RFID assembly preferably is disposed substantially beneath the end surface of the mold core. Plastic material, which preferably is the same plastic material as forms the plastic housing in which the inlay is contained, can be injected into a mold cavity surrounding the mold core and the assembly housing without eroding the material of the housing.

10 Claims, 2 Drawing Sheets

U.S. PATENT DOCUMENTS

| | | |
|---|---|---|
| 6,646,554 B1 | 11/2003 | Goff et al. |
| 6,724,308 B2 | 4/2004 | Nicholson |
| 6,957,777 B1 | 10/2005 | Huang |
| 7,070,053 B1 * | 7/2006 | Abrams et al. ............ 206/459.5 |
| 7,176,796 B2 | 2/2007 | Chen et al. |
| 7,342,501 B2 | 3/2008 | Abbott |
| 7,388,506 B2 | 6/2008 | Abbott |
| 7,439,933 B2 | 10/2008 | Uesaka |
| 2001/0021356 A1 | 9/2001 | Konrad |
| 2003/0235027 A1 | 12/2003 | Smeyak et al. |
| 2004/0008123 A1 | 1/2004 | Carrender et al. |
| 2004/0052034 A1 | 3/2004 | Senba et al. |
| 2004/0238623 A1 | 12/2004 | Asp |
| 2005/0068182 A1 | 3/2005 | Dunlap et al. |
| 2005/0099304 A1 | 5/2005 | Humphrey |
| 2005/0190070 A1 | 9/2005 | Rudduck et al. |
| 2005/0285735 A1 | 12/2005 | Imura et al. |
| 2006/0049948 A1 | 3/2006 | Chen et al. |
| 2006/0054705 A1 | 3/2006 | Garton et al. |
| 2006/0076419 A1 | 4/2006 | Johnson |
| 2006/0152364 A1 | 7/2006 | Walton |
| 2006/0255953 A1 | 11/2006 | Lyon et al. |
| 2007/0051691 A1 | 3/2007 | Hidding |
| 2007/0182562 A1 | 8/2007 | Abbott et al. |
| 2008/0068178 A1 | 3/2008 | Meyer |
| 2008/0129514 A1 * | 6/2008 | Chisholm ................ 340/572.8 |
| 2008/0309495 A1 | 12/2008 | Chisholm |

FOREIGN PATENT DOCUMENTS

| | | |
|---|---|---|
| DE | 20105605 U1 | 6/2001 |
| DE | 10010900 A1 | 9/2001 |
| DE | 20214099 U1 | 1/2003 |
| EP | 0408217 A1 | 1/1991 |
| EP | 0399316 B1 | 5/1993 |
| EP | 0586083 A2 | 3/1994 |
| EP | 0619243 A1 | 10/1994 |
| EP | 0782214 A1 | 7/1997 |
| EP | 1491317 A | 12/2004 |
| EP | 1491317 A1 | 12/2004 |
| GB | 2288103 A | 10/1995 |
| JP | 2002183690 A | 6/2002 |
| JP | 2004253858 A | 9/2004 |
| JP | 2006302219 A | 11/2006 |
| WO | WO 93/24381 | 12/1993 |
| WO | WO 93/24381 A1 | 12/1993 |
| WO | WO 97/38364 A1 | 10/1997 |
| WO | WO 03/023705 A1 | 3/2003 |
| WO | WO 03/060818 A2 | 7/2003 |
| WO | WO 2005/024745 A2 | 3/2005 |
| WO | WO 2005/040001 A1 | 5/2005 |
| WO | WO 2005/081182 A | 9/2005 |
| WO | WO 2006016184 A2 | 2/2006 |
| WO | WO 2006/039461 A2 | 4/2006 |

OTHER PUBLICATIONS

Collins, Jonathan, "Rafsec Debuts Packaging RFID Tag" RFID Journal Inc., Sep. 18, 2003, Available online at http://web.archive.org/web/20030920054334/http://www.rfidjournal.com/article/articleview/577/1/1/.*

PCT In'tl App. No. PCT/US2007/016393 Int'l Filing Date: Jul. 18, 2007 Int'l Search Report and Written Opinion mailed Feb. 20, 2009.

PCT/US2007/000817—Search Report, Written Opinion, and Preliminary Report, 23 pages.

PCT/US2007/000868—Notification, Search Report, Written Opinion, and Preliminary Report—30 pages.

PCT/US2007/000967—Notification, Search Report, Written Opinion and Preliminary Report—24 pages.

PCT/US2007/016116—Notification, Search Report, Written Opinion and Preliminary Report—21 pages.

PCT/US2007/016285—Notification, Search Report, Written Opinion and Preliminary Report—35 pages.

PCT/US2008/066428—Notification, Search Report, Written Opinion and Preliminary Report—21 pages.

International Search Report and Written Opinion For International Application No. PCT/US2007/016282, Mailing Date: Feb. 19, 2009, 23 pages.

Collins, Jonathan, "Rafsec Debuts Packaging RFID Tag" Article, Sep. 18, 2003, RFID Journal, webpage, www.rfidjournal.com/article.

Drobny, "Handbook Of Thermoplastic Elastomers", "4: Processing Methods Applicable To Thermoplastic Elastomers" excerpt, pp. 102-103.

* cited by examiner

MOLDED PLASTIC CONTAINER AND PREFORM HAVING INSERT-MOLDED RFID TAG

The present disclosure relates to manufacture of a molded plastic container having a radio frequency identification (RFID) tag insert molded into a wall of the container, to manufacture of a preform for blow molding into a plastic container and having an RFID tag insert molded into a wall of the preform, and to an RFID assembly for insert molding into the wall of a container or a container preform.

BACKGROUND AND SUMMARY OF THE DISCLOSURE

It has been proposed to place an RFID tag on or in a wall of a container to confirm the genuineness of the package that includes the container and/or to provide other information concerning the package or a product within the package. Such RFID tag can be secured to a wall of the container after fabrication of the container, embedded in a wall of the container during blow molding of the container, or assembled to a container preform in such a way that the tag will be embedded in a wall of the container following blow molding of the preform.

U.S. application Ser. No. 11/348,662 filed Feb. 7, 2006 discloses a method of making a plastic container having an RFID tag in a wall of the container by providing a mold that includes a mold core and mounting on the mold core an insert that includes an RFID tag. A plastic preform is formed in the mold around the mold core and insert such that the insert is embedded in a wall of the preform. The preform can be blow molded into a plastic container having the insert embedded in a wall of the container. In two exemplary embodiments disclosed in the noted application, the insert is mounted on the mold core by the heat of the mold core that causes the insert to adhere to the mold core, or by means of an embossment on the insert being press fit into a pocket on the mold core. A general object of the present disclosure is to provide a method of making a container and/or a container preform in which the RFID insert is reliably mounted on the mold core, and/or to provide an RFID insert for mounting on the mold core.

The present disclosure embodies a number of aspects that can be implemented separately from or in combination with each other.

An RFID assembly, in accordance with one aspect of the present disclosure, includes an RFID inlay, with an RFID tag, encapsulated within a plastic housing. The housing has a peripheral array of flexible resilient fingers for mounting the housing within a pocket on a support structure, such as a pocket on a mold core. The pocket preferably is on an end of the mold core so that the RFID assembly preferably is disposed substantially beneath the end surface of the mold core. Plastic material, which preferably is the same plastic material as forms the plastic housing in which the inlay is contained, can be injected into a mold cavity surrounding the mold core and the assembly housing without eroding the material of the housing.

BRIEF DESCRIPTION OF THE DRAWINGS

The disclosure, together with additional objects, features, advantages and aspects thereof, will best be understood from the following description, the appended claims and the accompanying drawings, in which:

DETAILED DESCRIPTION OF PREFERRED EMBODIMENTS

Figure 1:
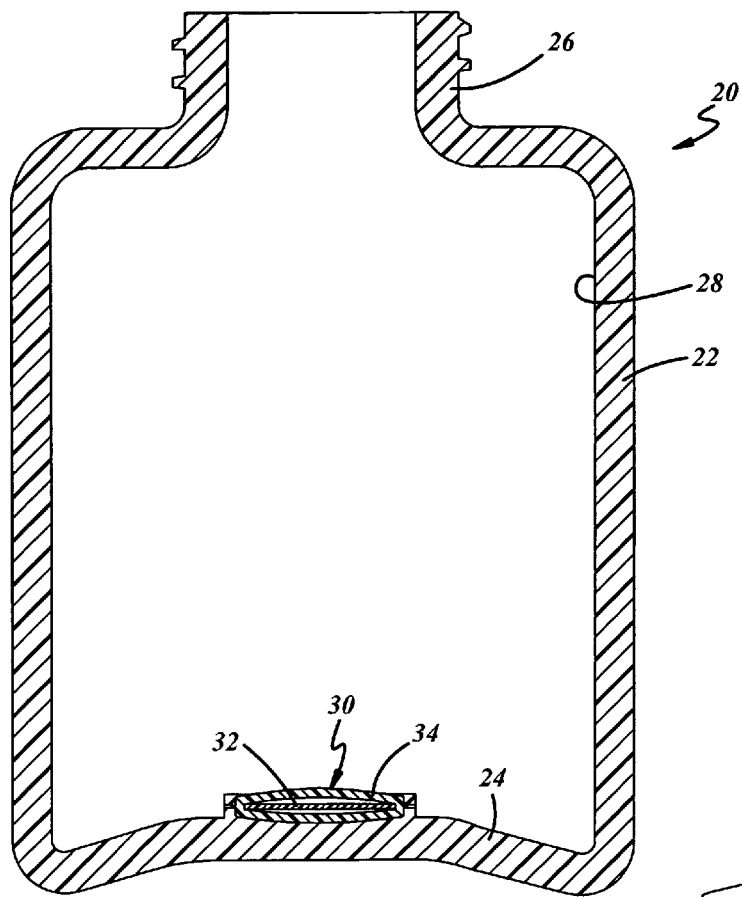
FIG. 1 is a sectional view of a blow molded plastic container in accordance with an exemplary embodiment of the present disclosure.

FIG. 1 illustrates a container 20 in accordance with an exemplary embodiment of the present disclosure. Container 20 includes a body with a sidewall 22 that connects a bottom wall 24 to a neck finish 26. Sidewall 22 can be of any suitable geometry, such as cylindrical. Bottom wall 24 is illustrated as having a center push-up, although this is not necessary to the present disclosure. Sidewall 22, bottom wall 24 and neck finish 26 can be of any suitable geometry and can have any suitable embossments or other features. In applications in which container 20 is for a consumable product, at least inside surface 28 of the container body preferably would be of a material approved by the FDA for contact with the consumable product in question. Container 20, including neck finish 26, sidewall 22 and/or bottom wall 24 can be of monolayer or multilayer construction. Neck finish 26 can be absent in some containers.

Figure 3:
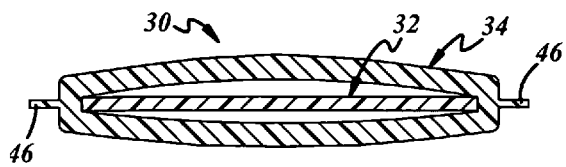
FIG. 3 is a sectional view taken substantially along the line 3-3 in FIG. 2.
Figure 4:
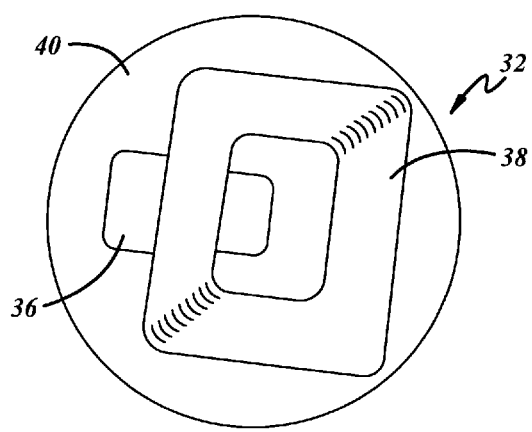
FIG. 4 is a plan view of the RFID inlay in the RFID assembly of FIGS. 2 and 3.

An RFID assembly 30 is insert molded into a wall of container 20, preferably bottom wall 24. RFID assembly 30 is illustrated in greater detail in FIGS. 2-4 as including an RFID inlay 32 disposed within a plastic housing 34. Plastic housing 34 preferably is molded around inlay 32, although housing 34 could be of multi-piece construction assembled to enclose inlay 32. An exemplary inlay 32 is illustrated in FIG. 4 as including an RFID tag or circuit 36 coupled to an rf antenna 38 and mounted on a substrate 40. The illustrated geometries of tag 36, antenna 38 and substrate 40 are exemplary only.

Figure 2:
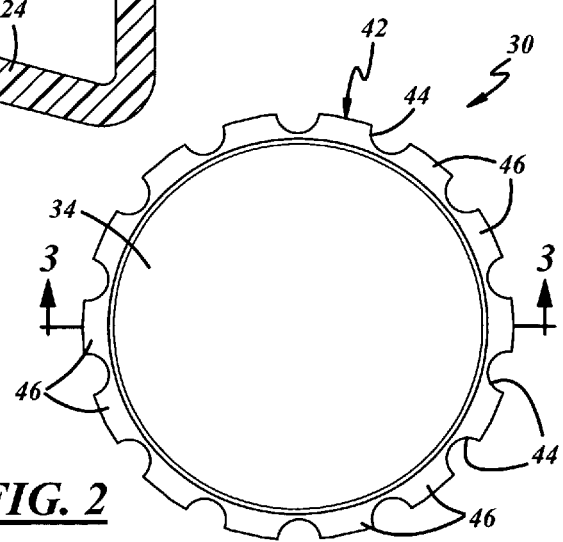
FIG. 2 is a top plan view of an RFID assembly in accordance with the exemplary embodiment of the present disclosure.

Housing 34, whether of unitary or multi-piece construction, preferably is circular in geometry as best seen in FIG. 2. A flange 42 extends radially outwardly from the periphery of housing 34, preferably at the midplane of housing 34. Flange 42 has a number of angularly spaced radially inwardly extending serrations or scallops 44 that effectively divide flange 42 into a plurality of angularly spaced radially outwardly extending flexible resilient fingers 46. Fingers 46 preferably have outer edges on a common circle of revolution coaxial with housing 34 and are flexible substantially independently of each other. Fingers 46 preferably are disposed in an array extending around the periphery of housing 34. Fingers 46 preferably lie in a common plane, but could be conical or propeller-shaped for example.

To form a plastic container, RFID assembly 30 is placed within a pocket 48 on the surface of a mold core 50. Pocket 48 preferably is disposed on the end of core 50, although pocket 48 could be on a side surface of the core. Pocket 48 preferably is circular in geometry and is sufficiently deep to receive substantially the entire height of assembly 30 so that housing 34 is disposed substantially beneath the end surface 52 of core 50. Assembly 30 is retained within pocket 48 by flexure of fingers 46 during insertion of assembly 30 into the pocket so that the fingers 46 retard removal of the assembly from the pocket.

Figure 6:
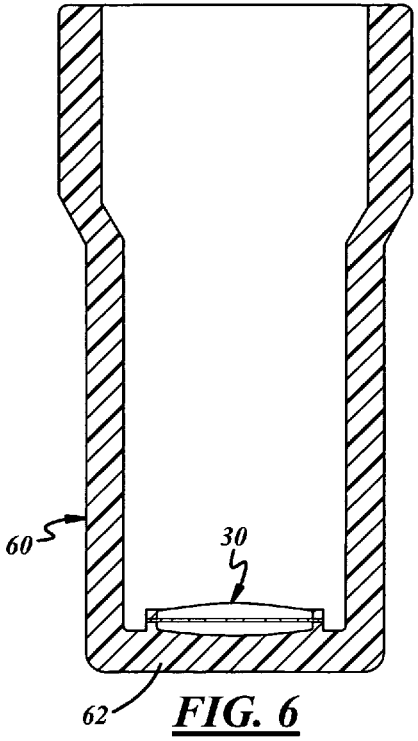
FIG. 6 is a sectional view of an exemplary container preform made in the apparatus of FIG. 5 for blow molding the plastic container of FIG. 1.
Figure 5:
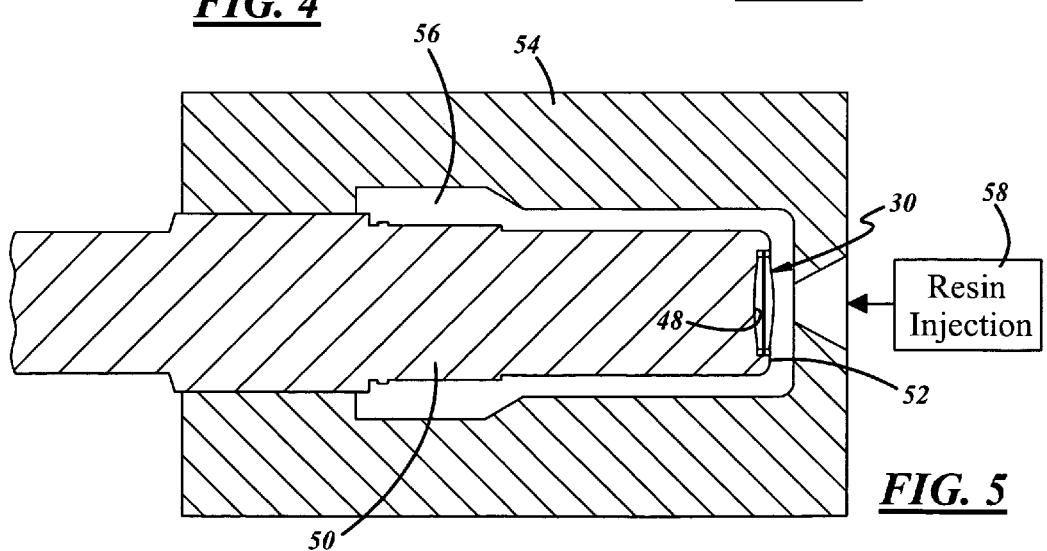
FIG. 5 is a sectional schematic illustration of an apparatus for molding a container preform in accordance with an aspect of the present disclosure.

With RFID assembly 30 thus firmly secured to core 50, core 50 is inserted into a mold 54 (FIG. 5) so as to form a mold cavity 56 around core 50 and assembly 30. Resin is then injected from a suitable source 58 into cavity 56 around core 50 and RFID assembly 30 to form a preform 60 (FIG. 6) in which RFID assembly 30 is embedded by insert molding, preferably within the end wall 62 of the preform. Preform 60 can be removed from core 50 for later processing in a reheat blow molding operation, or can be moved on core 50 to a blow mold station for blow molding container 20 (FIG. 1) in an injection blow molding operation.

A particular advantage of the exemplary embodiment of the disclosure illustrated in the drawings is that RFID assembly 30 is recessed with respect to end surface 52 of core 50 as resin material is injected from source 58 into mold cavity 56. This disposition of RFID assembly 30 during resin injection reduces or eliminates the tendency of the injected resin material to erode the material of RFID assembly plastic housing 34. RFID assembly plastic housing 34 can be of lower temperature plastic material, preferably the same plastic material as is injected from source 58. In other words, the plastic material of housing 34 can be the same as the plastic material of preform 60 and container 20. This eliminates issues of FDA regulations regarding material that can come into contact with the product, such as a consumable product, within the final container.

There thus have been disclosed an RFID assembly, a method of molding an RFID tag into a container, and a preform and a container made by such method, which fully satisfy all of the objects and aims previously set forth. The disclosure has been presented in conjunction with an exemplary embodiment, and additional modifications and variations have been discussed. Other modifications and variations readily will suggest themselves to persons of ordinary skill in the art in view of the foregoing description. The disclosure is intended to embrace all such modifications and variations as fall within the spirit and broad scope of the appended claims.

The invention claimed is:

1. A method of molding an RFID tag into a container, which includes the steps of:
   (a) providing a mold that includes a mold core having an outer surface with a pocket therein, and a mold cavity,
   (b) providing an RFID assembly that includes an RFID inlay, with an RFID tag, encapsulated within a plastic housing of a predetermined plastic material, said plastic housing having a peripheral array of flexible resilient fingers extending radially outwardly from said plastic housing for mounting said housing within said pocket in said mold core,
   (c) mounting said RFID assembly within said pocket of said mold core by releasably engaging said fingers with a periphery of said pocket, wherein said pocket is sufficiently deep to receive substantially the entire height of said RFID assembly,
   (d) inserting said mold core into said mold cavity, and
   (e) molding a container preform of said predetermined plastic material in said mold cavity around said mold core and said RFID assembly.

2. The method set forth in claim 1 wherein said step (e) is carried out by injection molding.

3. The method set forth in claim 2 wherein said pocket is of an end of said mold core.

4. The method set forth in claim 1 including:
   (f) blow molding said preform into a hollow plastic container.

5. A method of making a container for a consumable product, which includes the steps of:
   (a) providing an RFID tag encapsulated within a housing of a predetermined plastic material and having fingers extending radially outwardly from said housing, and
   (b) molding a plastic container of said predetermined plastic material around said housing including the steps of:
      (b1) mounting said housing in a pocket in an outer surface of a mold core, wherein said pocket is sufficiently deep to receive substantially the entire height of said RFID tag,
      (b2) placing said mold core within a mold cavity, and
      (b3) injecting said predetermined plastic material into said mold cavity around said core and said housing.

6. The method set forth in claim 5 wherein said housing is mounted in an end of said mold core and said method also including:
   (b4) removing a preform formed in said step (b3) from said mold core, and
   (b5) blow molding said preform into a container with said housing and said RFID tag embedded in a bottom wall of said container.

7. The method set forth in claim 1, wherein said step (e) includes injecting resin between said fingers to embed said RFID assembly into said container preform.

8. The method set forth in claim 5, wherein said step (b3) includes injecting resin between said fingers to embed said RFID assembly into said container preform.

9. A method of molding an RFID tag into a container, which includes the steps of:
   (a) providing a mold that includes a mold core having an outer surface with a circular pocket therein, and a mold cavity,
   (b) providing an RFID assembly that includes an RFID inlay, with an RFID tag, encapsulated within a circular housing, said housing having a peripheral array of flexible resilient fingers extending radially outwardly from a periphery of said circular housing for mounting said housing within said pocket in said mold core,
   (c) mounting said RFID assembly within said pocket of said mold core by releasably engaging said fingers with a periphery of said pocket, wherein said pocket is sufficiently deep to receive substantially the entire height of said RFID assembly,
   (d) inserting said mold core into said mold cavity, and
   (e) molding a container preform in said mold cavity around said mold core and said RFID assembly.

10. A method of making a container for a consumable product, which includes the steps of:
   (a) providing an RFID tag encapsulated within a circular housing having a peripheral array of flexible resilient fingers extending radially outwardly from said circular housing, and
   (b) molding a plastic container around said housing including the steps of:
      (b1) mounting said housing in a circular pocket in an outer surface of a mold core, wherein said pocket is sufficiently deep to receive substantially the entire height of said RFID assembly,
      (b2) placing said mold core within a mold cavity, and
      (b3) injecting plastic material into said mold cavity around said core and said housing.

* * * * *